United States Patent [19]
Heumann

[11] Patent Number: 5,907,910
[45] Date of Patent: Jun. 1, 1999

[54] METHOD FOR CYCLONE CONVERSION FOR A FLUIDIZED BED

[75] Inventor: William L. Heumann, Crestwood, Ky.

[73] Assignee: Fisher-Klosterman, Inc., Louisville, Ky.

[21] Appl. No.: 08/847,398

[22] Filed: Apr. 24, 1997

[51] Int. Cl.$^6$ .................................................. F26B 17/00
[52] U.S. Cl. .............................. 34/592; 34/376; 34/377; 34/589; 122/4 D
[58] Field of Search .............................. 34/360, 369, 373, 34/374, 377, 378, 379, 498, 576, 588, 589, 590, 591, 592, 79, 82; 122/4 D, 6 A, 20 B

[56] References Cited

U.S. PATENT DOCUMENTS

| | | | |
|---|---|---|---|
| 3,612,499 | 10/1971 | Weber | 432/80 |
| 3,618,916 | 11/1971 | Giorgi | 432/58 |
| 5,171,542 | 12/1992 | Sarkomaa | 422/146 |
| 5,218,931 | 6/1993 | Gorzegno . | |

Primary Examiner—Henry A. Bennett
Assistant Examiner—Pamela A. Wilson
Attorney, Agent, or Firm—Wheat, Camoriano, Smith & Beres, PLC

[57] ABSTRACT

A method has been found to improve the efficiency of a cyclone system for a fluidized bed. The typical plurality of cyclones arranged in series in communication with the fluidized bed is replaced by a plurality of similarly-sized cyclones arranged in parallel, so that the residence time in each of the cyclones is greater than it was in the original system, thereby greatly improving the recovery of particulate material while greatly reducing the energy consumption of the system.

2 Claims, 5 Drawing Sheets

| CYCLONE SYSTEM PERFORMANCE COMPARISON | | | |
|---|---|---|---|
| | FIGURE 2 (3 IN SERIES) | FIGURE 3 (3 IN 2 STAGES) | FIGURE 4 (3 IN PARALLEL) |
| TOTAL GAS FLOW THROUGH SYSTEM (CFM) | 6450 | 6450 | 6450 |
| CYCLONE DIAMETER (FT) | 2.8 | STAGE 1-2.5 STAGE 2-2.8 | 2.8 |
| L/D RATIO OF CYCLONES | 2.6 | STAGE 1-3 STAGE 2-4 | 4 |
| 24 HOUR LOSS RATES (LBS) | 28.38 | 13.63 | 10.93 |
| STAGE 1 INLET VEL. (F.P.S.) | 73.4 | 64 | 64 |
| STAGE 2 INLET VEL. (F.P.S.) | 83.3 | 73.7 | NA |
| STAGE 3 INLET VEL. (F.P.S.) | 83.3 | NA | NA |
| STAGE 1 INLET SIZE (INCHES) | 21.625 x 9.75 | 22 x 11 | 13 x 6 |
| STAGE 2 INLET SIZE (INCHES) | 20.375 x 9.125 | 15 x 7 | NA |
| STAGE 3 INLET SIZE (INCHES) | 20.375 x 9.125 | NA | NA |
| STAGE 1 OUTLET VEL. (F.P.S.) | 54.6 | 40.7 | 155.5 |
| STAGE 2 OUTLET VEL. (F.P.S.) | 61.7 | 201.1 | NA |
| STAGE 3 OUTLET VEL. (F.P.S.) | 61.7 | NA | NA |
| STAGE 1 OUTLET DIA. (INCHES) | 19 | 22 | 6.5 |
| STAGE 2 OUTLET DIA. (INCHES) | 17.875 | 7 | NA |
| STAGE 3 OUTLET DIA. (INCHES) | 17.875 | NA | NA |
| ATTRITION RATE (LBS/24 HRS.) | 24.6 | 16.3 | 16.3 |
| PRESSURE DROP (INCHES OF WATER) | 47.87 | 38.46 | 19.15 |
| EQ. BED PSD% LESS THAN: | | | |
| 2.5 MICRON | 0.0001 | 0.0001 | 0.0006 |
| 10 MICRON | 0.0017 | 0.0244 | 8.0022 |
| 20 MICRON | 0.5000 | 0.5507 | 13.9980 |
| 40 MICRON | 25.4300 | 25.4724 | 25.4921 |

2 STAGE CYCLONE SYSTEM

3 STAGE CYCLONE SYSTEM

2 STAGE CYCLONE SYSTEM

| CYCLONE SYSTEM PERFORMANCE COMPARISON | | | |
|---|---|---|---|
| | FIGURE 2 (3 IN SERIES) | FIGURE 3 (3 IN 2 STAGES) | FIGURE 4 (3 IN PARALLEL) |
| TOTAL GAS FLOW THROUGH SYSTEM (CFM) | 6450 | 6450 | 6450 |
| CYCLONE DIAMETER (FT) | 2.8 | STAGE 1-2.5 STAGE 2-2.8 | 2.8 |
| L/D RATIO OF CYCLONES | 2.6 | STAGE 1-3 STAGE 2-4 | 4 |
| 24 HOUR LOSS RATES (LBS) | 28.38 | 13.63 | 10.93 |
| STAGE 1 INLET VEL. (F.P.S.) | 73.4 | 64 | 64 |
| STAGE 2 INLET VEL. (F.P.S.) | 83.3 | 73.7 | NA |
| STAGE 3 INLET VEL. (F.P.S.) | 83.3 | NA | NA |
| STAGE 1 INLET SIZE (INCHES) | 21.625 x 9.75 | 22 x 11 | 13 x 6 |
| STAGE 2 INLET SIZE (INCHES) | 20.375 x 9.125 | 15 x 7 | NA |
| STAGE 3 INLET SIZE (INCHES) | 20.375 x 9.125 | NA | NA |
| STAGE 1 OUTLET VEL. (F.P.S.) | 54.6 | 40.7 | 155.5 |
| STAGE 2 OUTLET VEL. (F.P.S.) | 61.7 | 201.1 | NA |
| STAGE 3 OUTLET VEL. (F.P.S.) | 61.7 | NA | NA |
| STAGE 1 OUTLET DIA. (INCHES) | 19 | 22 | 6.5 |
| STAGE 2 OUTLET DIA. (INCHES) | 17.875 | 7 | NA |
| STAGE 3 OUTLET DIA. (INCHES) | 17.875 | NA | NA |
| ATTRITION RATE (LBS/24 HRS.) | 24.6 | 16.3 | 16.3 |
| PRESSURE DROP (INCHES OF WATER) | 47.87 | 38.46 | 19.15 |
| EQ. BED PSD% LESS THAN: | | | |
| 2.5 MICRON | 0.0001 | 0.0001 | 0.0006 |
| 10 MICRON | 0.0017 | 0.0244 | 8.0022 |
| 20 MICRON | 0.5000 | 0.5507 | 13.9980 |
| 40 MICRON | 25.4300 | 25.4724 | 25.4921 |

FIG. 7

METHOD FOR CYCLONE CONVERSION FOR A FLUIDIZED BED

BACKGROUND OF THE INVENTION

The present invention relates to cyclones used for dust collection, and, in particular, to cyclones which are used to return particulate material to a fluidized bed.

In the prior art, many fluidized beds have a plurality of cyclones connected in series, so that particulate-laden gas passes through the first cyclone, where much of the particulate material is removed from the gas and is returned to the bed, then passes through the second cyclone, where some more of the particulate material is returned to the bed, and possibly through a third cyclone, where additional particulate material is returned to the bed. So, in this typical situation, the same gas passes through all the cyclones, and there is approximately the same gas flow rate through all of the cyclones.

The particulate material that is being returned to the fluid bed is often a catalyst, which is very expensive, so there is a great financial benefit to recovering the particulate material.

The cyclones consume a large amount of energy, which is expensive. They also encounter problems in that, instead of sending captured particulates down the dip leg of the cyclone into the fluidized bed, sometimes they draw particulates up the dip leg from the fluidized bed, which greatly reduces their efficiency.

SUMMARY OF THE INVENTION

The present invention involves the discovery that, using cyclones having substantially the same outside dimensions as the prior art cyclones, so that approximately the same amount of construction material is used and approximately the same volume of space is occupied by the cyclones, great improvements in efficiency can be achieved by designing the cyclones to be arranged in parallel rather than in series. In this improved arrangement, for a given flow rate of total gas being treated, the flow rate in each cyclone is greatly reduced, and the residence time in each cyclone is greatly increased. This results in returning a substantially greater amount of particulate material to the fluidized bed, while consuming far less energy than the prior art systems.

This means that, for essentially the same cost of constructing the cyclone, and occupying essentially the same volume in the plant, the operator of the plant saves a large expense in energy costs and saves a large expense which would have been incurred to replace the expensive catalyst that was lost in the original system.

BRIEF DESCRIPTION OF THE DRAWINGS

FIG. 7 is a chart, showing the comparison of performance among the systems of FIGS. 2, 3, and 4.

DESCRIPTION OF THE PREFERRED EMBODIMENTS

Figure 1:
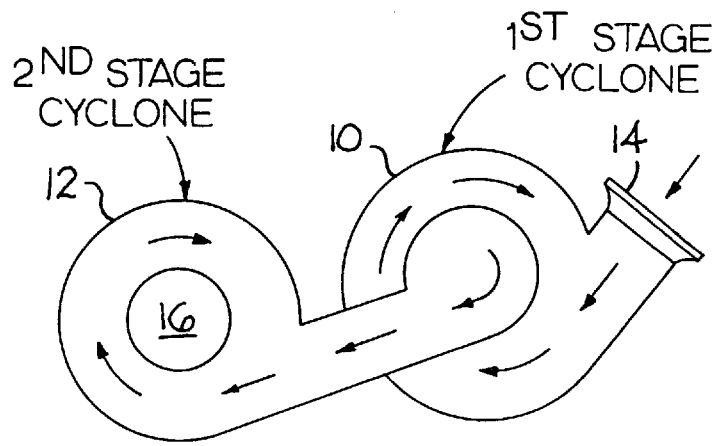
FIG. 1 is a schematic view of a typical, prior art, two-stage cyclone system, in which two cyclones are connected in series.

In the prior art, it is typical, in a fluidized bed system, to connect two or three cyclones in series to separate out the particulate material in the gas and return it to the fluidized bed. A two-stage, series cyclone system is shown in FIG. 1, in which the particulate-laden gas from the fluid bed enters the first stage cyclone 10 at the inlet 14 and passes through the first stage cyclone 10 into the second stage cyclone 12. Some particulate material is separated out of the gas stream in the first cyclone 10 and is returned to the fluid bed (not shown), so that there is less particulate material to be separated out in the second stage cyclone 12. As the gas continues to flow through the second stage cyclone 12, more particulate material is separated out of the gas and is returned to the fluid bed from the second stage cyclone 12. The cleaned gas then leaves the outlet 16 of the second stage cyclone 12. So, in this system, the entire gas flow flows through both cyclones 10, 12.

Great amounts of energy are consumed in blowing the gas through the cyclones, and this expense is justified, because the particulate material which is recovered in the cyclone is very expensive to replace. However, it is always desirable to reduce the energy consumption and increase the amount of material recovered, as this improves the profitability of the plant.

Figure 2:
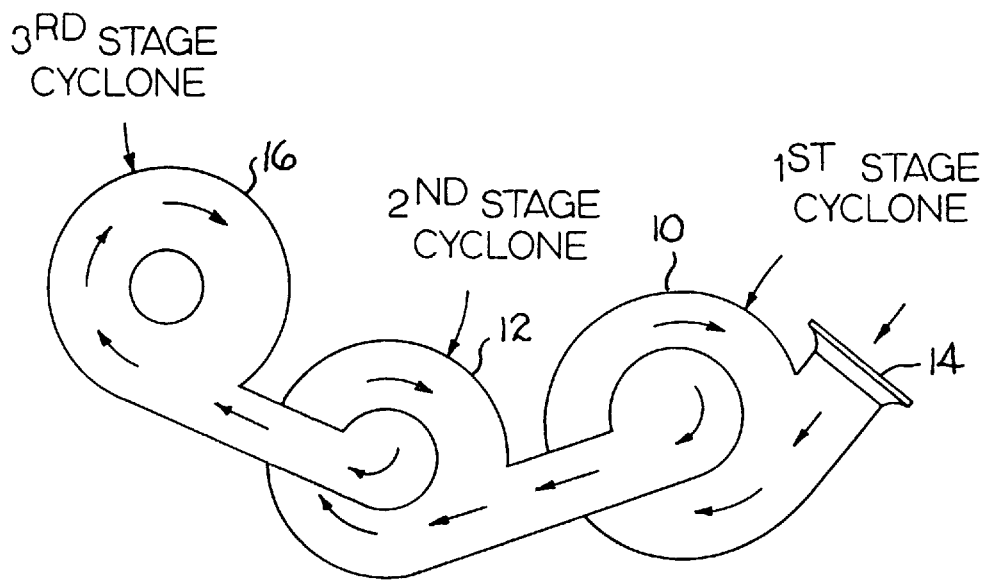
FIG. 2 is a schematic view of a typical, prior art, three-stage cyclone system in which the cyclones are connected in series.

FIG. 2 shows a three-stage, series cyclone arrangement of the prior art, which again is typical for use with fluid beds. In this arrangement, the particulate-laden gas enters the first stage cyclone 10 at the inlet 14; some particulate material is separated out and is returned to the fluid bed; the remaining gas leaves the first cyclone 10 and enters the second cyclone 12, where again some particulate material is separated out of the gas and is returned to the bed; and then the gas goes into the third stage cyclone 16, where some more particulate material is separated out and returned to the fluid bed.

Figure 3:
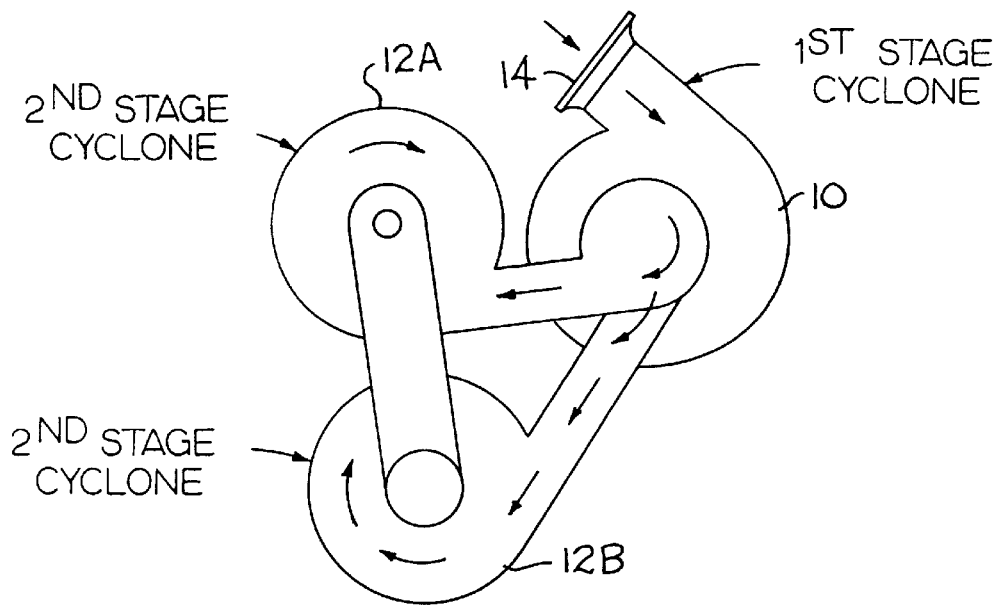
FIG. 3 is a schematic view of a prior art cyclone system, in which there is a single first stage cyclone which feeds two second-stage cyclones connected in parallel.

FIG. 3 shows another type of prior art cyclone arrangement, in which a first stage cyclone 10 feeds two second-stage cyclones 12A, 12B, arranged in parallel. In this arrangement, all the gas to be treated flows through the inlet 14 of the first stage cyclone 10, and then the output gas from the first stage cyclone 10 is split, with some of the gas going to one of the second stage cyclones 12A, and the rest of the gas going to the other second stage cyclone 12B.

It should be noted that, in all these prior art arrangements, there may be many sets of cyclones set up in the arrangements shown here. For example, there may be six sets of cyclones, with each set arranged in a three-stage system, or a total of eighteen cyclones.

Figure 5:
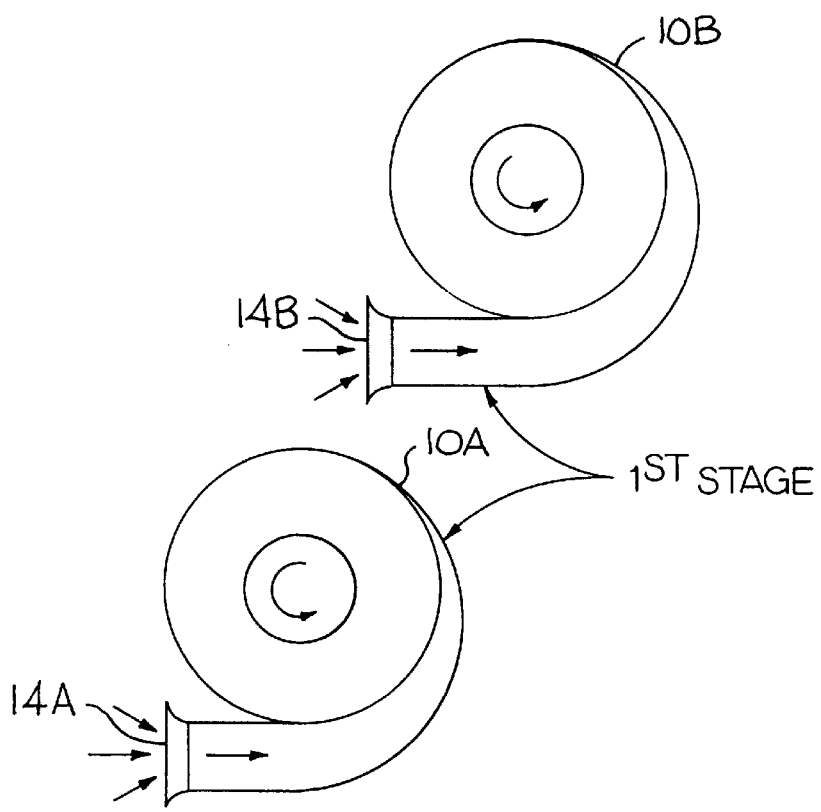
FIG. 5 is schematic view of a cyclone system made in accordance with the present invention, in which two cyclones are connected in parallel.
Figure 4:
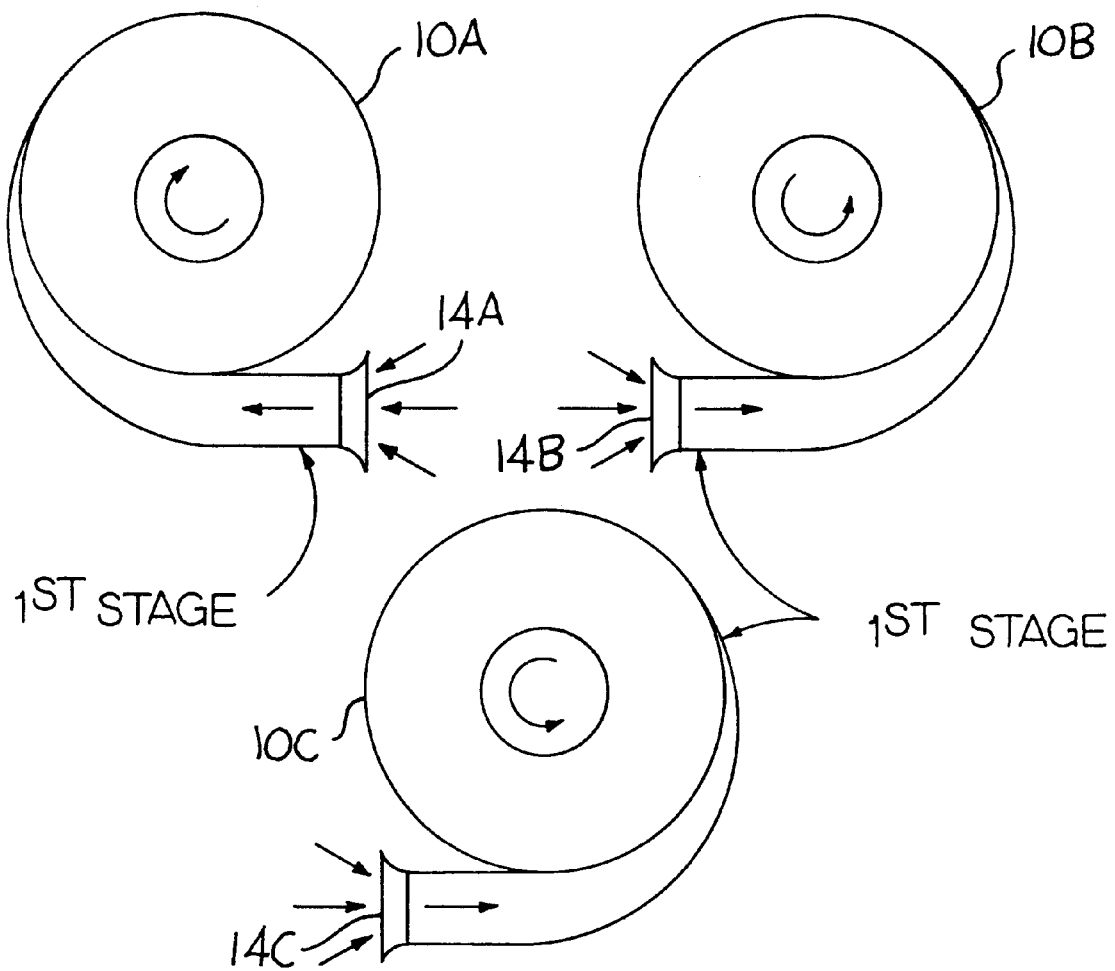
FIG. 4 is a schematic view of a cyclone system made in accordance with the present inventon, in which three cyclones are connected in parallel.

FIGS. 4 and 5 show preferred modifications that can be made to the arrangements of FIGS. 1, 2, and 3 in accordance with the present invention.

FIG. 4 shows a schematic conversion in accordance with the present invention, in which three first stage cyclones 10A, 10B, 10C are arranged in parallel to replace the three series cyclones of FIG. 2 or to replace the three cyclones of FIG. 3, which are arranged in a two-stage system. In this arrangement, each first stage cyclone 10A, 10B, 10C receives inlet gas through its respective inlet 14A, 14B, 14C from the fluid bed, and each first stage cyclone 10A, 10B, 10C returns particulate material to the fluid bed. These three cyclones have approximately the same outside dimensions as the three cyclones in FIG. 2 or 3, they occupy approximately the same volume as the three cyclones in FIG. 2 or 3, and they treat approximately the same amount of gas, but their performance is substantially better than the two-stage and three-stage systems shown in FIGS. 3 and 2, respectively.

Since only one-third of the gas that is treated has to pass through each of the cyclones of FIG. 4, while the entire amount of gas that is treated has to pass through all of the cyclones of FIGS. 2 and 3, the flow rates can be greatly reduced in the present system. This means that the residence time in each cyclone is greatly increased from the prior art system, and it results in collection of substantially more particulate matter. Also, if the inlet velocities are reduced from the prior art, the attrition rate (the rate at which large particles are reduced to small particles below 12.5 microns) is greatly reduced, meaning that less of the catalyst material is destroyed in the cyclone. Also, the pressure drop through the system of FIG. 4 is much less than the pressure drop through the systems of FIGS. 2 and 3, which means that it takes much less energy to blow the gas through the present system, thereby saving energy costs.

Similarly, FIG. 5 shows two parallel first stage cyclones 10A, 10B being used to replace the two series cyclones of FIG. 1. As with the system in FIG. 4, both of the cyclones 10A, 10B of FIG. 5 receive particulate-laden gas from the fluid bed through their inlets 14A, 14B, so that the gas flow being treated is split between the two cyclones 10A, 10B. Again, this permits flow rates to be reduced, attrition rates to be reduced, and residence times to be increased. The cyclones cost about the same to manufacture and take up about the same amount of space in the plant but perform much better than the cyclones they replace.

Figure 6:
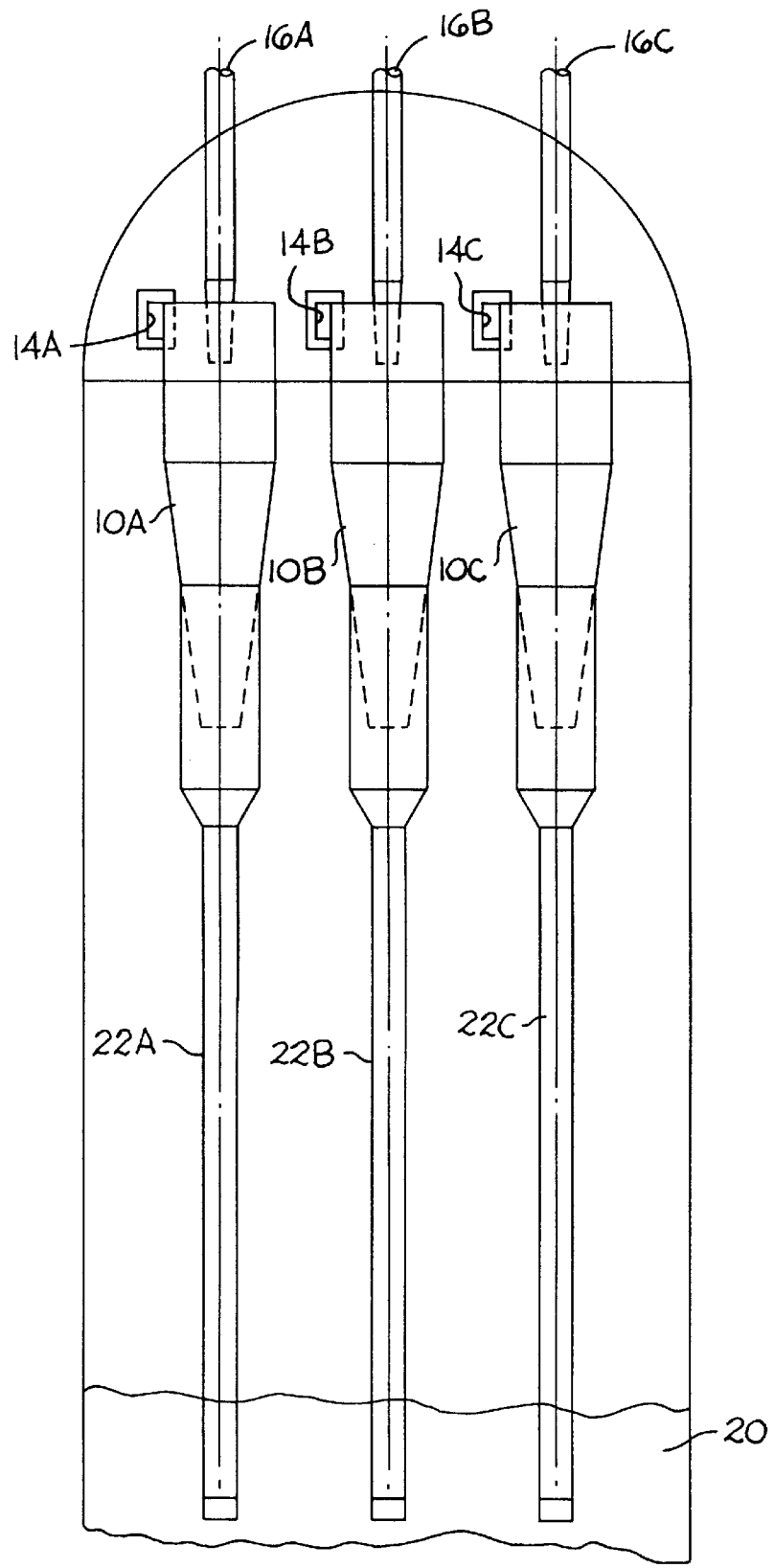
FIG. 6 shows the system of FIG. 4 in conjunction with a fluidized bed.

FIG. 6 is a schematic view showing the three cyclones of FIG. 4 in combination with the fluid bed 20. It can be seen that each cyclone 10A, 10B, 10C has its own inlet 14A, 14B, 14C in communication with the fluid bed 20, and each cyclone returns particulate material through a dip leg 22A, 22B, 22C to the fluid bed 20. For the three cyclones of FIG. 6 to treat a given flow of gas, each cyclone receives one-third as much flow as would each cyclone in the system of FIG. 2.

FIG. 7 is a chart showing actual test data, indicating the performance of the cyclone systems made in accordance with FIGS. 2, 3, and 4. First, it should be noted that the total gas flow through each system is 6450 cubic feet per minute, so the same amount of gas is being treated in all three systems. This means that, in the system of FIG. 2, each cyclone receives 6450 cubic feet per minute. In the system of FIG. 3, the first stage cyclone receives 6450 cubic feet per minute, and each of the second stage cyclones 12A, 12B receives half of that flow, or 3225 cubic feet per minute. The system of FIG. 4, which is an embodiment of the present invention, has the same flow through the system, but each cyclone receives only one-third of that total flow, or 2150 cubic feet per minute.

The sizes of the cyclones in all three systems are approximately the same. The diameter of the cyclones in FIG. 2 is 2.8 feet. In FIG. 3, the first stage cyclone has a diameter of 2.5 feet, and the second stage cyclones have a diameter of 2.8 feet. In FIG. 4, each cyclone has a diameter of 2.8 feet. The length/diameter ratios of the cyclones are as follows: In FIG. 2, the L/D ratio of the cyclones is 2.6. In FIG. 3, the L/D ratio of the first stage cyclone is 3 and of the second stage cyclones is 4. In FIG. 4, the L/D ratio of the cyclones is 4. Thus, the replacement cyclones have approximately the same surface area and occupy approximiately the same volume as the cyclones they replace.

So, all the systems are treating the same amount of gas, in the same type of fluid bed, having the same loading of particulate material. But the results of the three systems are very different. It should be noted that all calculations are based on the same catalyst, having a particle density of 129.79 pounds per cubic foot.

The system of FIG. 2 loses 28.38 lbs of particulate material (catalyst) each day, while the system of FIG. 3 loses 13.63 lbs per day, and the system of FIG. 4, employing the present invention, loses only 10.93 lbs per day, which is a 61% improvement over the system of FIG. 2 and a 20% improvement over the system of FIG. 3.

In addition to recovering much greater amounts of particulate material, the system of FIG. 4 has a much lower pressure drop across the system than the pressure drop across the prior art systems, which means that the amount of energy required to drive the system is greatly reduced. The pressure drop across the system of FIG. 2 is 47.87 inches of water; the drop across the system of FIG. 3 is 38.46 inches of water; and the pressure drop across the system of FIG. 4 is 19.15 inches of water, or an improvement of 60% over FIG. 2 and an improvement of 50% over FIG. 3.

The equilibrium bed particle size distribution in the system of FIG. 4 shows that the system of the present invention recovers much more of the smaller particle size material than do the prior art systems.

Thus, by removing the prior art multi-stage systems of FIGS. 1, 2 or 3, and replacing them with a single stage of cyclones arranged in parallel in accordance with the present invention, the performance of the system is greatly improved while using approximately the same amount of material to build the cyclones and taking up approximately the same amount of space in the plant.

It will be obvious to those skilled in the art that modifications may be made to the embodiments of the invention described herein without departing from the scope of the present invention.

What is claimed is:

1. A method of improving the efficiency of a cyclone system for a fluidized bed, in which there is a first plurality of cyclones, having a given outside surface area, arranged in series and in communication with a fluidized bed so as to return particulate material to the fluidized bed, comprising the step of:

replacing said first plurality of cyclones with a second plurality of cyclones, having approximately the same outside surface area as the first plurality of cyclones, but arranged in parallel, so that, for a given flow rate through the cyclone system, the flow rate through each of the second cyclones is substantially less than was the flow rate through each of the first cyclones.

2. A method of improving the efficiency of a cyclone system for a fluidized bed, in which there is a first plurality of cyclones, occupying a given volume, arranged in series and in communication with a fluidized bed so as to return particulate material to the fluidized bed, comprising the step of:

replacing said first plurality of cyclones with a second plurality of cyclones, occupying approximately the same volume as the first plurality of cyclones, but having smaller diameter inlets and outlets than the first plurality of cyclones and arranged in parallel.

\* \* \* \* \*